(12) United States Patent
Klaassen et al.

(10) Patent No.: US 12,297,655 B2
(45) Date of Patent: May 13, 2025

(54) FLANGE

(71) Applicant: Siemens Gamesa Renewable Energy A/S, Brande (DK)

(72) Inventors: Jacobus Klaassen, Voorburg (NL); Erwin de Jong, The Hague (NL)

(73) Assignee: Siemens Gamesa Renewable Energy A/S, Brande (DK)

( * ) Notice: Subject to any disclaimer, the term of this patent is extended or adjusted under 35 U.S.C. 154(b) by 299 days.

(21) Appl. No.: 17/798,633

(22) PCT Filed: Jan. 19, 2021

(86) PCT No.: PCT/EP2021/051085
§ 371 (c)(1),
(2) Date: Aug. 10, 2022

(87) PCT Pub. No.: WO2021/164971
PCT Pub. Date: Aug. 26, 2021

(65) Prior Publication Data
US 2023/0151629 A1 May 18, 2023

(30) Foreign Application Priority Data
Feb. 21, 2020 (EP) .................................... 20158766

(51) Int. Cl.
*E04H 12/08* (2006.01)
*E04H 12/34* (2006.01)
*F03D 13/20* (2016.01)

(52) U.S. Cl.
CPC ......... *E04H 12/085* (2013.01); *E04H 12/342* (2013.01); *F03D 13/20* (2016.05)

(58) Field of Classification Search
CPC ...... E04H 12/085; E04H 12/342; F03D 13/20
See application file for complete search history.

(56) References Cited

U.S. PATENT DOCUMENTS 9,546,573 B2 * 1/2017 Westergaard ........... F03D 13/10
9,551,325 B2 * 1/2017 Ebbesen ................. F03D 13/20
(Continued)

FOREIGN PATENT DOCUMENTS

| CN | 102076920 A | 5/2011 |
|---|---|---|
| CN | 102471039 A | 5/2012 |

(Continued)

OTHER PUBLICATIONS

International Search Report & Written Opinion for PCT/EP2021/051085, mailed on Apr. 29, 2021.

*Primary Examiner* — Andrew J Triggs
(74) *Attorney, Agent, or Firm* — Schmeiser, Olsen & Watts LLP

(57) ABSTRACT

A flange is provided for connection to a complementary flange, and wherein the flange includes an annular connection face to lie against a complementary annular connection face of the complementary flange; a first body section with a primary bolt circle including an annular arrangement of inclined openings to receive a set of fasteners for connecting the flange to the complementary flange and a second body section with a secondary bolt circle including an annular arrangement of openings to receive a set of fasteners for connecting the flange to an interim structure. Also provided is a method of handling a cylindrical tower section equipped with such a flange.

12 Claims, 6 Drawing Sheets

(56) References Cited

U.S. PATENT DOCUMENTS

Figure 1:
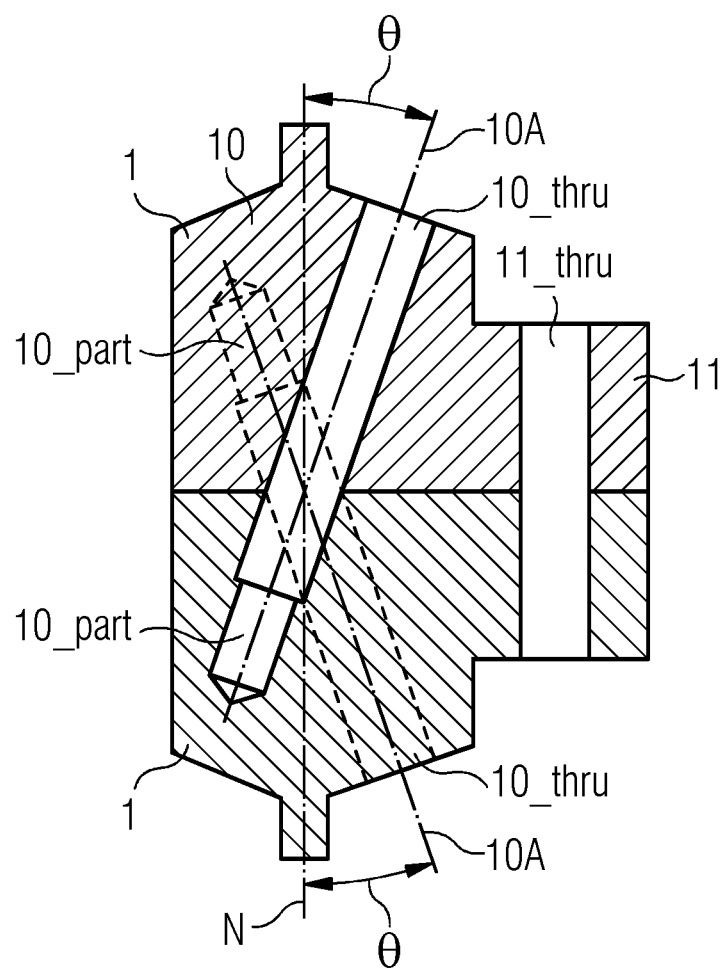

| | | | |
|---|---|---|---|
| 11,713,839 B2* | 8/2023 | Klaassen | E04H 12/085 285/412 |
| 11,719,014 B2* | 8/2023 | Klaassen | E04H 12/085 52/849 |
| 2011/0135492 A1 | 6/2011 | Tetambe et al. | |
| 2011/0154757 A1* | 6/2011 | Rosengren | F03D 13/20 52/651.01 |
| 2012/0107084 A1 | 5/2012 | Krogh | |
| 2015/0068150 A1 | 3/2015 | Mathiasen | |
| 2023/0151629 A1* | 5/2023 | Klaassen | E04H 12/085 52/849 |

FOREIGN PATENT DOCUMENTS

| | | | |
|---|---|---|---|
| CN | 104179633 A | 12/2014 | |
| DE | 102013011479 A1 | 8/2014 | |
| EP | 2 664 790 A2 | 11/2013 | |
| JP | S54 125821 A | 9/1979 | |
| JP | 2000265571 A | 9/2000 | |
| KR | 20120073788 A | 7/2012 | |
| NL | 1004960 C1 | 7/1998 | |
| WO | 2009/132659 A2 | 11/2009 | |
| WO | 2011/009500 A1 | 1/2011 | |
| WO | 2013/097866 A1 | 7/2013 | |

* cited by examiner

FLANGE

CROSS-REFERENCE TO RELATED APPLICATIONS

This application claims priority to PCT Application No. PCT/EP2021/051085, having a filing date of Jan. 19, 2021, which claims priority to EP Application No. 20158766.4, having a filing date of Feb. 21, 2020, the entire contents both of which are hereby incorporated by reference.

FIELD OF TECHNOLOGY

The following describes a flange for connection to a complementary flange; and a method of handling a cylindrical tower section equipped with such a flange.

BACKGROUND

Tall towers such as wind turbine towers are generally constructed by connecting tower sections together. To this end, each tower section is equipped with flanges. A common flange shape is the "L-flange", and complementary L-flanges are connected together by fasteners such as bolts arranged in a bolt circle. Tower sections may be manufactured to have L-flanges with inner bolt circles (i.e., the flange extends into the tower interior) or outer bolt circles (i.e., the flange extends outward from the tower).

Large wind turbines of the types currently in development have very long rotor blades and therefore require taller towers. However, the limited load-bearing capacity of the commonly used L-flange connection places constraints on the tower structure.

The strength of a flange connection depends on various parameters, for example on the choice of steel, the wall thicknesses, the bolt diameters, the number of bolts in the bolt circle, the load-path etc. To increase the strength of a flange connection between tower sections, one approach may be to use a "T-flange" instead, which has the shape of an inverted "T" with an inner flange extending into the tower interior and an outer flange extending outward from the tower. A T-flange may have twice the strength of an L-flange, i.e., it can withstand loads twice as great as the loads that could be withstood by a comparable L-flange. However, a major disadvantage of the T-flange is that it requires access from the outside of the tower as well as access from the tower interior. Although T-flanges are seen as a solution in some cases on account of their greater load-bearing capacity, the assembly and lifetime servicing of a multi-section tower using T-flanges is very expensive.

SUMMARY

An aspect relates to an improved flange connection that overcomes the problems described above.

According to embodiments of the invention, the flange is part of a structural component and is realized for connection to a complementary flange that is part of a further structural component. The inventive flange comprises an essentially planar annular connection face that will lie against a complementary annular connection face of the complementary flange; a first body section with a primary bolt circle comprising an annular arrangement of alternately inclined openings to receive a first set of fasteners for connecting the flange to the complementary flange; and a second body section with an at least partial secondary bolt circle comprising an annular arrangement of openings for temporarily connecting the flange to an interim structure.

In the following, for the sake of simplicity but without restricting embodiments of the invention in any way, it may be assumed that the structural component is a tower section, for example a wind turbine tower section. A tower section may also be referred to as a "tower shell" in the following. An embodiment of the inventive flange is "part of" the structural component at the time when the structural components are being connected. This shall be understood to mean that a structural component and its flange may be regarded as a single entity. The structural component and its flange may be formed as a single body. Equally, the structural component and its flange may be manufactured separately and then joined, for example a flange may be welded to a steel tower shell, or the upright cylindrical portion of a flange may be embedded in an outer end of a concrete tower shell.

The primary bolt circle shall be understood as the circle along which lie the openings at the flange connection face. The diameter of the primary bolt circle may be assumed to be similar or equal to the mean diameter of the tower section or tower shell. The inclined openings extend from the flange connection face into the body of the flange. An advantage of the primary bolt circle is that the joint is effectively moved "into" the tower shell, i.e., the force exerted by a tightened bolt is directed along an inclined path that intersects the mean diameter of the tower shell. This means that loads are much more effectively transferred from one tower shell to the next tower shell. In contrast, the vertical bolts of an conventional L-flange are always at a distance removed from the mean diameter of the tower shell, so that the load path is offset, resulting in greater bending moments.

The openings of the secondary bolt circle may be assumed to be vertical in the conventional sense, i.e., perpendicular to the connection face of the flange. The secondary bolt circle is provided exclusively for connection to an interim structure and overcomes the practical difficulties that would be associated with using the primary bolt circle (with its inclined openings) for this purpose.

With its primary bolt circle and secondary bolt circle, the inventive flange effectively offers structural strength comparable to that of a T-flange without sacrificing the main advantage of the L-flange, namely access to the primary bolt circle from within the tower interior.

An "interim structure" may be understood in the context of embodiments of the invention to be any apparatus such as a holding structure used during transportation of the tower section, a lifting interface used during installation of the tower section, etc. The interim structure may be assumed to not be an element of the tower of which the tower section will be a part.

The terms "flange" and "complementary flange" are to be understood in the usual sense to mean flanges that are essentially identical, e.g., mirror images of each other, so that they can be connected together.

An advantage of the inventive flange is that it combines two separate aspects, which in combination lead to a compact yet strong flange connection. In a first aspect, the flange connection is made by bolting two instances of the inventive flange together, with a set of fasteners arranged in the inclined openings of the primary bolt circle. Because of the manner in which the primary bolt circle is formed, this set of inclined fasteners is in favorably close proximity to the tower section body. In a second aspect, the tower section can be connected to an interim structure with relative ease, by fasteners extending through the secondary bolt circle.

According to embodiments of the invention, the method of handling a cylindrical tower section equipped with such a flange comprises any of forming a temporary connection between the tower section and a holding apparatus by a number of fasteners inserted through the secondary bolt circle of the flange and subsequently releasing the temporary connection by removing the fasteners from the secondary bolt circle; and/or forming a permanent connection between the tower section and a further tower section by a number of fasteners inserted through the primary bolt circle of the flange and through the primary bolt circle of the complementary flange of the further tower section.

The tower section may be assumed to have an essentially cylindrical form, for example a straight cylinder. Equally, a tower section may have a frusto-conical form so that, for example, the diameter at its upper end is smaller than the diameter at its lower end. The tower section may be assumed to have an essentially circular cross-sectional shape.

The tower section may be assumed to be "solid", i.e., to have solid side walls, for example of steel or concrete, although the inventive flange connection is not limited to tower sections with solid side walls.

The inventive flange essentially comprises a first body section that incorporates the primary bolt circle, and a second body section that incorporates the (partial or complete) secondary bolt circle. As will be explained below, the inventive flange can be realized as a one-piece component or as a two-piece component.

In the following, it may be assumed that the flange has the general shape of an "L", i.e., the second body section of the flange is essentially a lip or collar that extends into the interior space of the tower section.

An inclined opening of the primary bolt circle is characterized by the angle of inclination θ subtended between its longitudinal axis and a surface normal of the flange connection face. In other words, the longitudinal axis of a primary bolt circle opening is inclined relative to the horizontal plane. In an embodiment of the invention, this angle of inclination θ is between 15° and 25°.

In an embodiment of the invention, the primary bolt circle comprises an alternating arrangement of downward-extending inclined openings and upward-extending inclined openings. In an embodiment of the invention, using an "upper" flange for the purpose of discussion, a downward-extending inclined opening extends through the flange to accommodate the shank of a fastener extending into a complementary inclined opening of the lower flange, and an upward-extending inclined opening extends from the contact face partway into the flange to accommodate the threaded end of a fastener extending into the flange from the "lower" flange.

A downward-extending inclined opening is a through-opening formed such that a fastener inserted through the flange extends into an inclined opening of the complementary flange. The downward-extending inclined openings are therefore "through-holes" since they extend all the way through the body of the flange.

An upward-extending inclined opening is a threaded opening formed to receive the threaded end of a fastener inserted into the flange via an inclined opening of the complementary flange. The upward-extending inclined openings are therefore "blind holes" since they terminate in the body of the flange.

When viewed from the contact surface, the flange therefore shows a ring of openings. Every second opening is an "exit" opening of the inclined through-holes, and the other openings are the "entrance" openings of the oppositely inclined blind holes. To form a flange connection, two flanges are arranged face-to-face, so that each "exit" opening is aligned with its counterpart "entrance" opening.

Since the inventive flange combines two types of bolt circle, namely a bolt circle with alternating inclined fasteners and the bolt circle known from the "L-flange", the inventive flange may be referred to in the following as an "X-L-flange". The "X-L-flange" has a favorably high load-bearing capacity because of the alternating arrangement of inclined bolts and because the bolts "cross each other" along a ring that coincides with, or is at least very close to, the tower shell diameter. This results in a more efficient load path, so that prying moments of the type that typically arise in L-flange connections are essentially eliminated. The load-bearing capacity of the inventive flange is comparable to the load-bearing capacity of a comparable "T-flange". However, unlike the conventional art "T-flange", assembly of a tower using the inventive "X-L-flange" does not require access from the outside of the tower. This is because all fasteners or studs of the primary bolt ring can all be inserted from inside the tower. This aspect is especially important for the assembly of towers at offshore locations, or at locations in which external cranes cannot be deployed to provide access platforms for personnel.

While the purpose of the primary bolt circle is to allow two flanges to be permanently bolted together, the purpose of the secondary bolt circle is to allow a flange to be temporarily connected to some interim structure. In an embodiment of the invention, the longitudinal axis of an opening of the secondary bolt circle is collinear with a surface normal of the flange connection face, i.e., the bolt holes extend vertically through the flange and can easily be accessed.

The secondary bolt circle can be based on a complete ring, or on arc-sections of a ring. When based on a complete ring, the second body section is similar in shape to an L-flange, extending horizontally from the first body section towards the flange interior. When based on arc-sections of a circle, the second body section can comprise angular segments, for example each segment subtending an angle of 30° to the midpoint of the flange, with four such sections evenly spaced about the inner perimeter of the first body section. Such an embodiment as the advantage of reduced material costs.

In an embodiment of the invention, the flange is manufactured as a one-piece component. In such an embodiment, a secondary benefit is the increased stiffness given by the second body section, i.e., the lip or collar that comprises the secondary bolt circle. This body section or structural element assists in minimizing ovalization during transport, i.e., it helps to reduce or eliminate the likelihood of flange deformation during storage or transport, which might otherwise result in the flange developing a slightly oval form.

In an embodiment of the invention, the flange is realized as a two-part flange with a first body section comprising the primary bolt circle and a second body section comprising the secondary bolt circle. In an embodiment, the second body section is mounted to the first body section by welding, or by fasteners extending parallel to the flange connection face.

From the conventional art, it is known to design the flanges of various tower shell diameters to have a specific bolt circle diameter (BCD). This simplifies flange design and reduces flange manufacturing costs, but can lead to higher costs elsewhere, for example when a certain flange BCD requires an adapter so that the flange can be connected to a transport fitting or lifting apparatus. Since the inventive flange can be realized as a two-part component, it is relatively easy to provide a range of second body sections, each with a different BCD. In this way, a suitable second body section can be chosen on the basis of the BCD of an interim structure which will be used in handling the tower section.

When two tower sections are connected together, loads are generally transferred essentially vertically. Therefore, in an embodiment of the invention, the inner diameter of the annular flange connection face exceeds the diameter of the secondary bolt circle. This can be achieved for example by machining a recess in the second body section of a flange in order to limit the contact area between flanges to the regions between the upper tower section body and the lower tower section body. In other words, the thickness of the second body section is reduced.

A further advantage of this embodiment is that such a recess also helps to better define the flange contact face. Restricting the contact area to the region relevant to load-transfer makes it is easier to identify performance-relevant imperfections such as gaps between the flange contact faces. Such a gap would compromise the load transfer path. This embodiment of the invention allows quick identification of such gaps, so that these can be remedied by shimming before tightening the fasteners of the primary bolt circle.

As mentioned above, some degree of ovalization may develop in a tower section before assembly of the tower. In an embodiment of the invention, the flange comprises an alignment feature that is formed adjacent to the inner diameter of the flange connection face and shaped to engage with an inverse alignment feature of a complementary flange. When one tower section is lowered into place over another tower section, the weight of the upper tower section in conjunction with the alignment features will be sufficient to correct any ovalization.

In an embodiment of the invention, the method of handling a tower section during tower assembly comprising a step of inserting a guide pin through an opening of the secondary bolt circle to align the flange of one tower section to the complementary flange of the other tower section.

BRIEF DESCRIPTION

Figure 2:
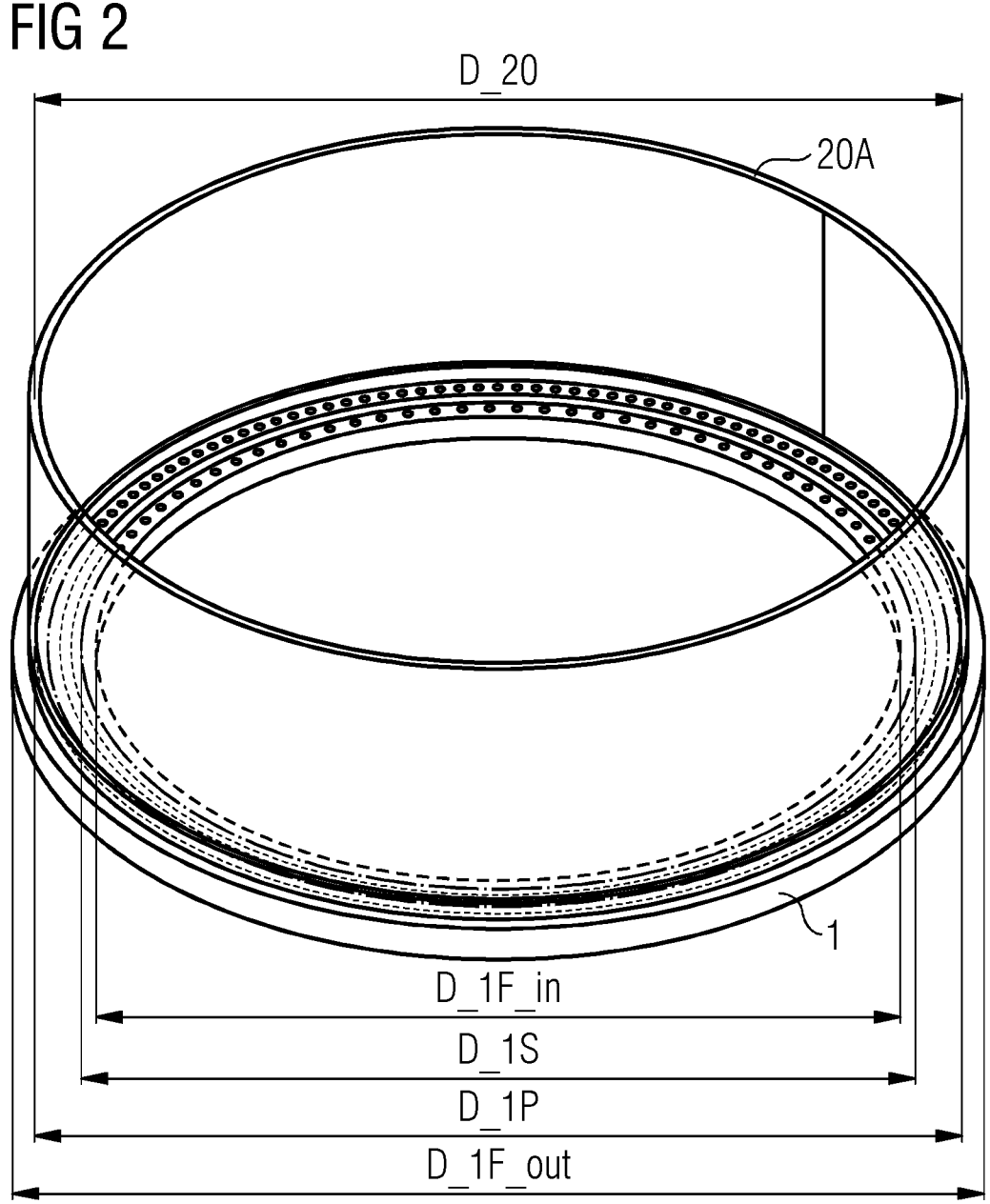
Figure 3:
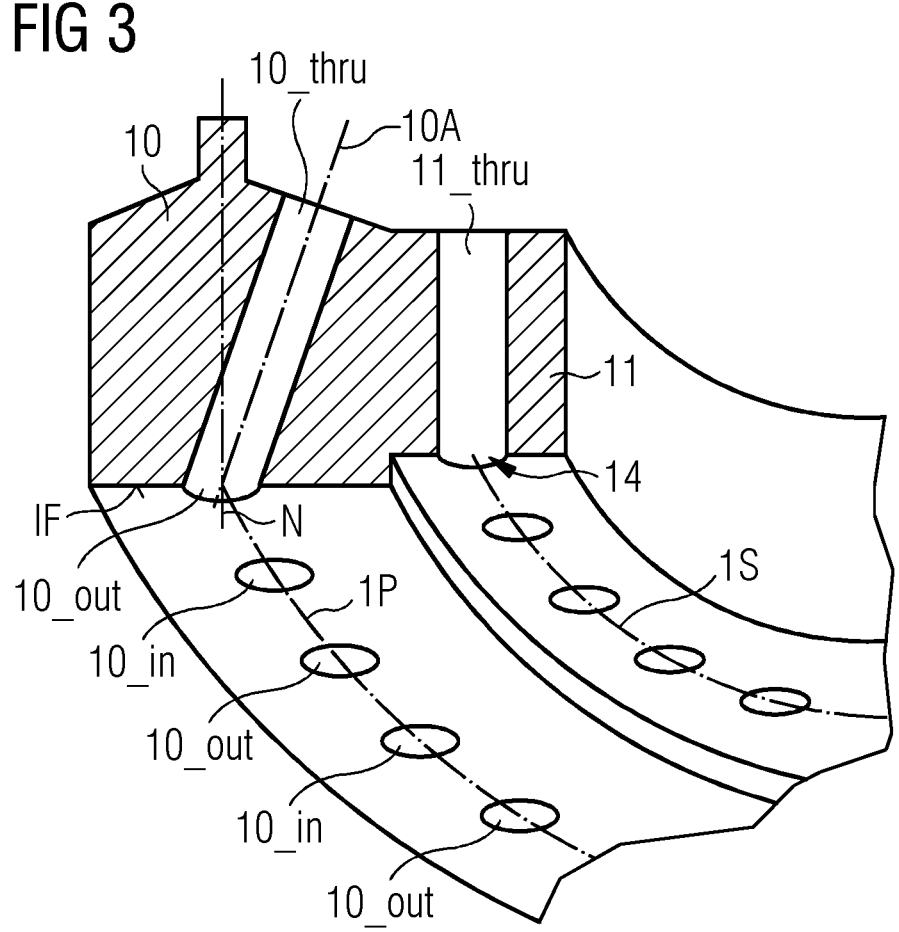
Figure 4:
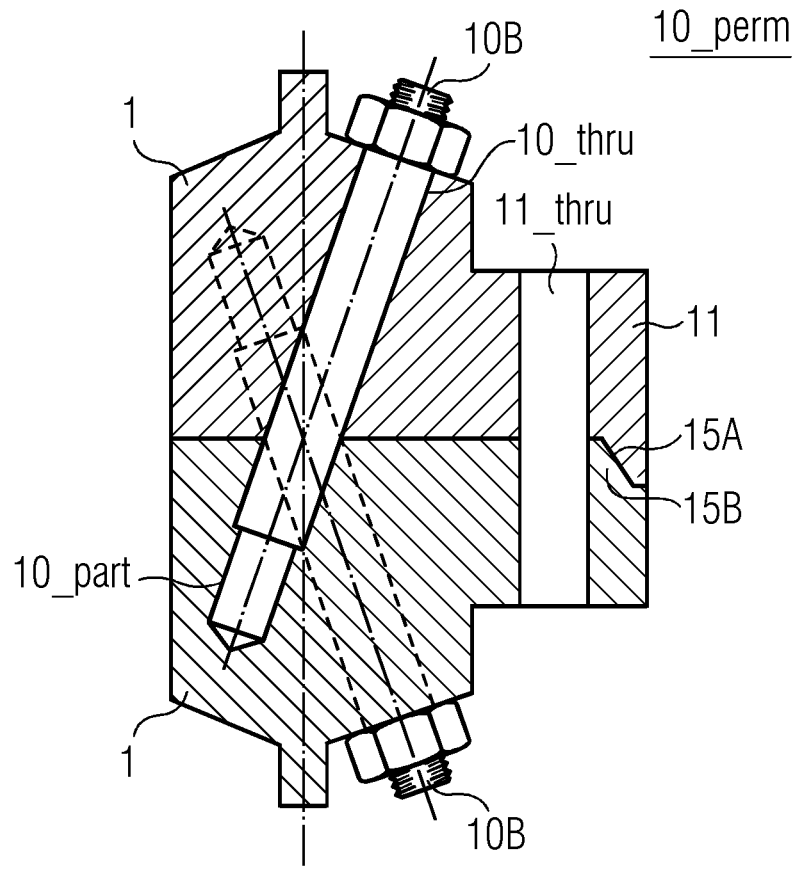
Figure 5:
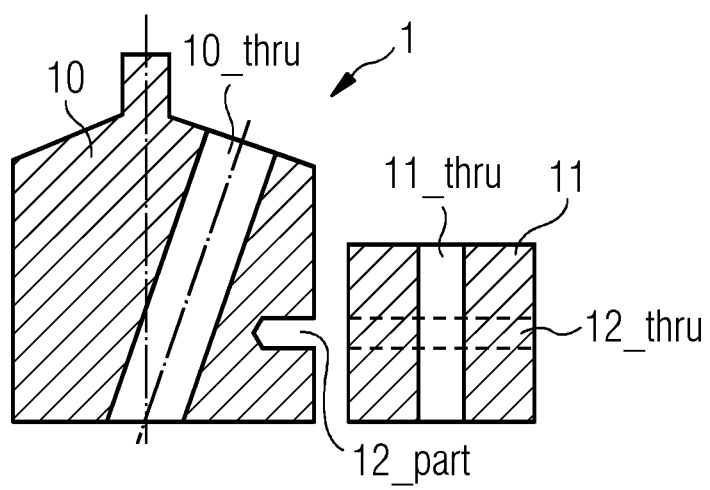
Figure 6:
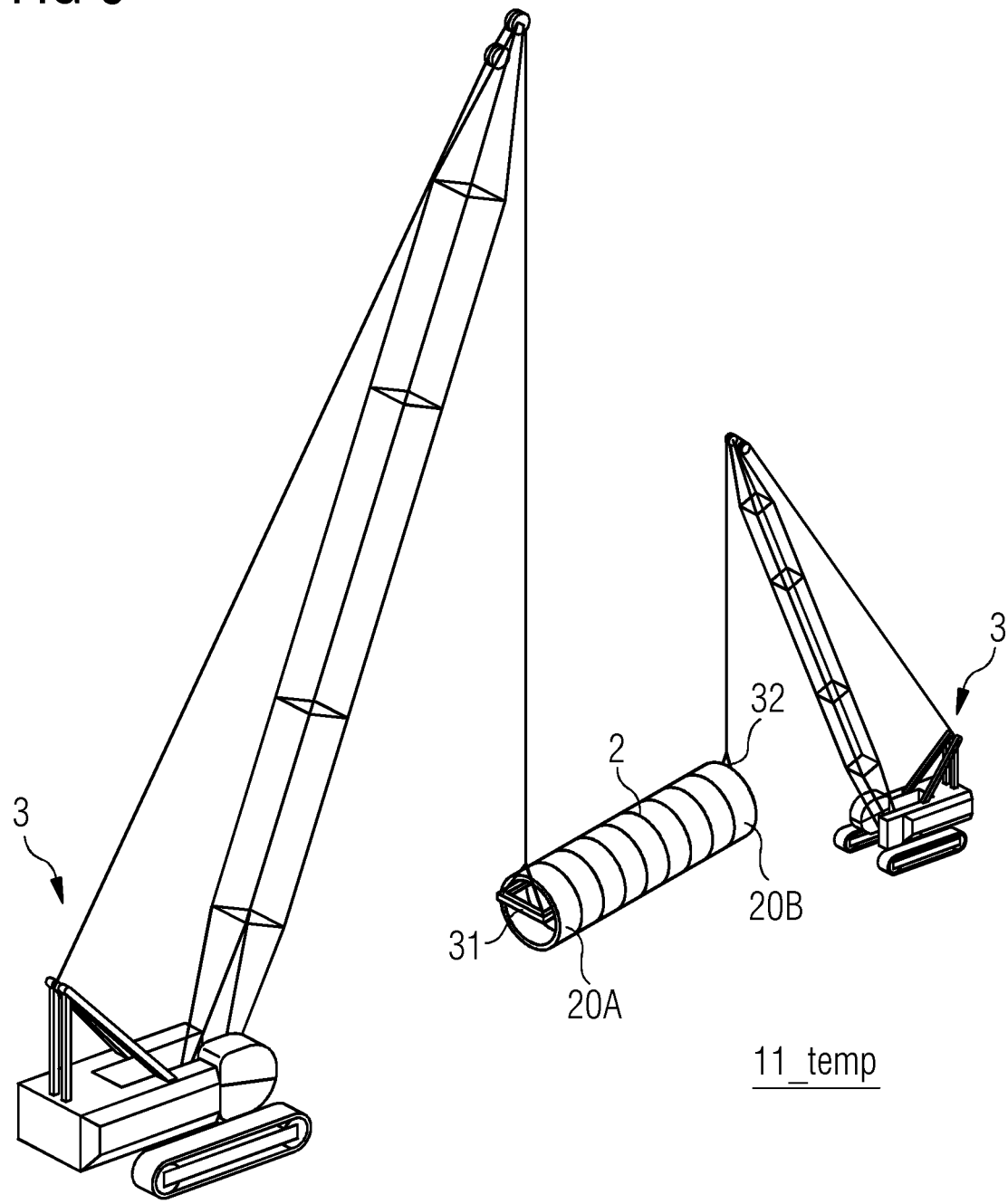
Figure 7:
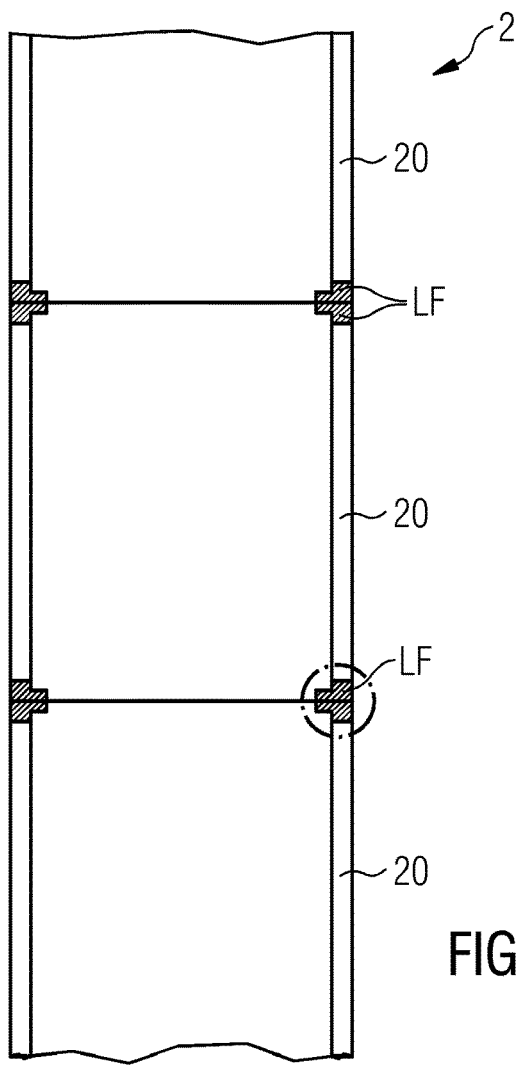
Figure 8:
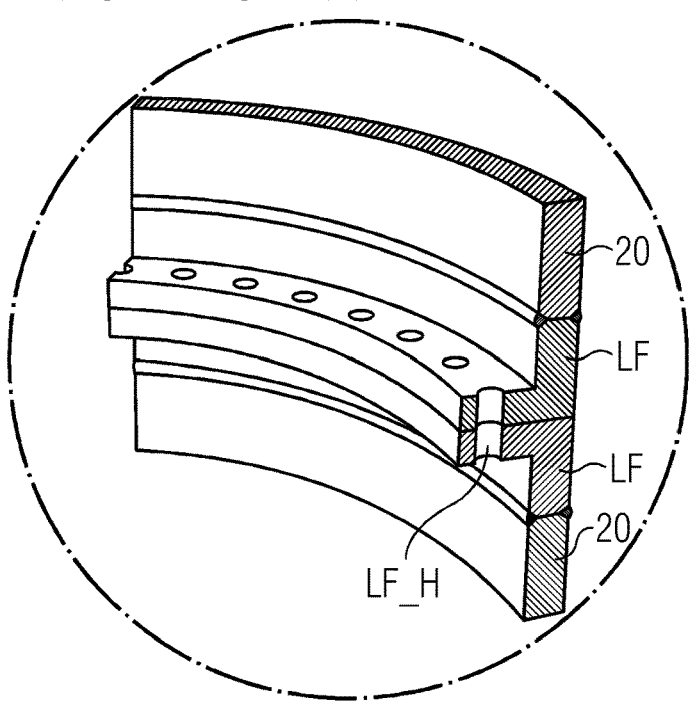

Some of the embodiments will be described in detail, with reference to the following figures, wherein like designations denote like members, wherein:

FIG. 1 shows embodiments of the flange;
FIG. 2 shows embodiments of the flange;
FIG. 3 shows embodiments of the flange;
FIG. 4 shows embodiments of the flange;
FIG. 5 shows embodiments of the flange;
FIG. 6 shows an embodiment of the flange connected to an interim structure;
FIG. 7 shows a tower comprising stacked tower sections connected according to the conventional art; and
FIG. 8 shows a tower comprising stacked tower sections connected according to the conventional art.

DETAILED DESCRIPTION

FIG. 1, FIG. 2, and FIG. 3 illustrate an embodiment of the inventive flange 1. A tower section of a wind turbine can have a mean diameter in the order of 6-8 m, and the inventive flange 1 is dimensioned accordingly. FIG. 1 shows (in cross-section) one instance of an embodiment of the inventive flange 1 connected to a functionally identical instance of the flange 1. Each flange 1 has a first body section 10 and a second body section 11. The first body section 10 incorporates a primary bolt circle 1P comprising an annular arrangement of inclined openings 10_thru, 10_part to receive a set of fasteners 10B for connecting the flange 1 to the complementary flange 1. An inclined opening 10_thru, 10_part of the primary bolt circle 1P is characterized by the angle of inclination θ subtended between its longitudinal axis 10A, 10A' and a surface normal N of the flange connection face 1F. In FIG. 1, the center of the "exit" opening of the through-hole 10_thru and the center of the "entrance" opening of the blind hole 10_part are points along the primary bolt circle 1P. This is more clearly seen in the perspective view given by FIG. 3, which shows the alternating arrangement of through-hole "exit" openings 10_out and blind hole "entrance" openings 10_in that form the primary bolt circle 1P.

FIG. 2 shows an embodiment of the inventive flange 1 as part of a tower section 20A. The diagram indicates the diameter D 1P of the primary bolt circle 1P, and the mean diameter D_20 of the tower section 20A.

Ideally, the primary bolt circle 1P has the same diameter D 1P as the mean diameter D_20 of the tower shell 20A, i.e., the primary bolt circle 1P is in-line with (i.e., coincides with) the mid-plane of the tower shell 20A (as indicated in FIG. 3). However, it may be necessary to slightly offset the primary bolt circle 1P from the tower shell mid-plane, for example to allow non-destructive testing of a weld between flange 1 and tower shell 20A (a weld joint between flange and tower shell is close to the outer ends of the inclined through-openings 10_thru). Such an offset between primary bolt circle 1P and tower shell mid-plane is kept to a minimum, in order to maintain the favorably high load-carrying capacity of the inventive flange 1.

Each second body section 11 incorporates a secondary bolt circle 1S with an annular arrangement of openings 11 to receive a set of fasteners 11B for connecting the flange 1 to an interim structure (not shown). FIG. 3 indicates the secondary bolt circle 1S defined by the openings 11, and FIG. 2 indicates the diameter D_1S of the secondary bolt circle 1S. The area of the annular connection face 1F is determined by the outer diameter D_1F_out and the inner diameter D_1F_in of the flange 1.

The structure shown in FIG. 2 can be one end of a tower part that is made of several stacked cylindrical elements. The two outer ends of the tower part each terminate in an instance of the inventive flange 1. The joints between the cylindrical elements can be done using conventional L-flanges or using the inventive X-L-flange.

As shown in FIG. 3, a flange has a connection face 1F that will lie against the connection face of a complementary flange. The diagram also indicates a possible variant, showing a recess 14 at the lower face of the flange 1. The inner diameter D_1F_in of the annular flange connection face 1F therefore exceeds the diameter D_1S of the secondary bolt circle 1S. In this embodiment, the total area of the connection face 1F is less than the connection face area of the embodiment shown in FIG. 1, but the load from an upper tower section is still effectively transferred into the body of a lower tower section. The recess 14 can facilitate easier connection to an interim apparatus (not shown).

FIG. 4 shows a permanent flange connection 10_perm made by joining two instances of the inventive flange 1. The connection is "permanent" in the sense that it may endure for the lifetime of the structure. Here, each flange 1 is formed to have an alignment feature 15A shaped to engage with an inverse alignment feature 15B of the complementary flange 1. The alignment features 15A, 15B act to correct any slight ovalization that may be present in a flange, when the tower sections are stacked. The drawing shows a fastener 10B extending through a through-hole 10_thru in the upper flange 1 and into a blind tapped opening 10_part of the lower flange 1. The drawing also indicates another oppositely inclined fastener 10B extending through a through-hole 10_thru in the lower flange 1 and into a blind tapped opening 10_part of the upper flange 1.

FIG. 5 shows a further embodiment of the inventive flange 1. Here, the flange 1 is realized as a two-part flange with a first body section 10 and a separate second body section 11. A horizontal opening for a fastener is provided by a through-opening 12_thru in the second body section and a partial or blind opening 12_part in the first body section. The blind opening can have an internal thread to receive the threaded end of a metal screw inserted though the second body section. In this exemplary embodiment, the through-opening 12_thru, 12_part extends parallel to the flange connection face 1F. An alternative to such a bolted joint may be to weld the second body section 11 to the first body section 10.

FIG. 6 indicates embodiments of the inventive flange 1 in temporary connections 11_temp to interim structures. Here, the flange 1 at the upper end 20A of the tower part 2 is connected to a lifting fitting 31 of a crane 3, and the flange 1 at the lower end 20B of the tower part 2 is connected to an upending tool 32 of another crane 3. The cranes 3 are controlled so that the tower part 2 is "upended", i.e., moved from a horizontal storage orientation into a vertical installation orientation. These connections 11_temp are "temporary" in the sense that the interim structures 31, 32 will be disconnected again from the flanges 1. The flange 1 at each end 20A, 20B of the tower part 2 will be permanently connected to a complementary flange 1 in a later stage of the tower assembly process, as explained above with the aid of FIG. 4.

A tower part is generally handled at multiple stages between manufacture and final installation, and the secondary bolt circle 18 is therefore used to connect the flange at either end of the tower part to a cradle or bracket of a support structure, an anti-ovalization tool, an adapter of a transport vehicle, etc.

FIG. 7 shows a tower 2 such as a wind turbine tower, comprising tower sections 20 "stacked" on top of each other and connected in a conventional art manner using L-flanges LF. Fasteners are inserted into the bolt circle on the interior, the through-holes LF_H are indicated in the enlarged portion shown in FIG. 8. The offset between bolt circle and tower wall means that this type of connection is vulnerable to excessive bending moments. As a result, the overall height of the tower 2 can be constrained by the load-bearing limitations of the flange connections. To overcome these constraints, an alternative conventional art structure uses T-flanges to connect the tower sections 20 with interior and exterior bolt circles, but such a solution is associated with significantly higher costs as explained above.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A flange for connection to a complementary flange, and wherein the flange comprises:
   an annular connection face to lie against a complementary annular connection face of the complementary flange;
   a first body section with a primary bolt circle comprising a first annular arrangement of inclined openings to receive a first set of fasteners for connecting the flange to the complementary flange;
   a second body section with a secondary bolt circle comprising a second annular arrangement of openings to receive a second set of fasteners for connecting the flange to an interim structure;
   wherein the flange is formed as a two-part flange with the first body section comprising the primary bolt circle and the second body section separate from the first body section and comprising the secondary bolt circle; and
   wherein the second body section is mounted to the first body section by at least one fastener extending through an opening parallel to the annular connection face.

2. The flange according to claim 1, wherein at least one inclined opening of the first annular arrangement of inclined openings of the primary bolt circle comprises an angle of inclination subtended between a longitudinal axis of the at least one inclined opening and a surface normal to the annular connection face.

3. The flange according to claim 1, wherein an angle of inclination of at least one inclined opening of the first annular arrangement of inclined openings of the primary bolt circle is at least 10°.

4. The flange according to claim 1, wherein an angle of inclination of at least one inclined opening of the first annular arrangement of inclined openings of the primary bolt circle is at most 30°.

5. The flange according to claim 1, wherein the primary bolt circle comprises an alternating arrangement of inclined through openings and inclined blind openings.

6. The flange according to claim 1, wherein an inclined through opening extends through the flange to accommodate a shank of a fastener extending into a complementary blind opening of the complementary flange.

7. The flange according to claim 1, wherein a blind opening extends partway into the flange to accommodate a threaded end of a fastener extending into the flange after passing through an inclined through opening of the complementary flange.

8. The flange according to claim 1, wherein a longitudinal axis of at least one opening of the second annular arrangement of openings of the secondary bolt circle is collinear with a surface normal of the annular connection face.

9. The flange according to claim 1, wherein the flange is formed as a two-part flange with the first body section comprising the primary bolt circle and the second body section separate from the first body section and comprising the secondary bolt circle.

10. The flange according to claim 1, wherein an inner diameter of the annular connection face exceeds a diameter of the secondary bolt circle.

11. The flange according to claim 1, comprising an alignment feature shaped to engage with an inverse alignment feature of the complementary flange.

12. A wind turbine tower comprising a plurality of cylindrical tower sections, each of the plurality of cylindrical tower sections equipped with at least one flange according to claim 1 and permanently connected by the first set of fasteners inserted through the first annular arrangement of inclined openings provided in each primary bolt circle of each of the at least one flange of the plurality of cylindrical tower sections.

* * * * *